Dec. 6, 1927.
C. H. LEMERY
PISTON RING
Filed Jan. 20, 1927
1,651,721
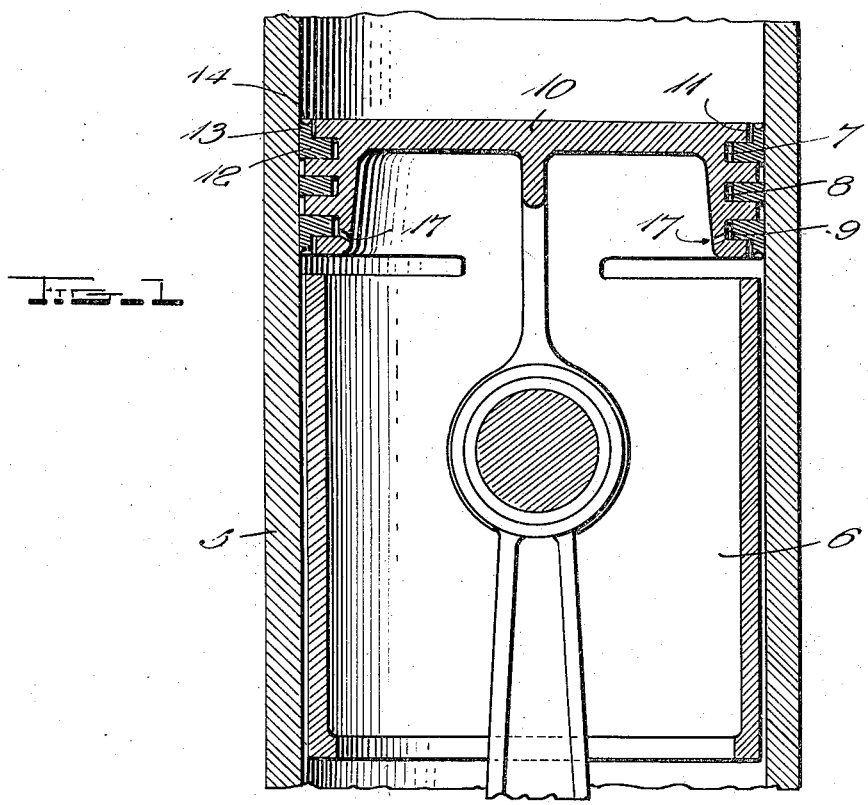
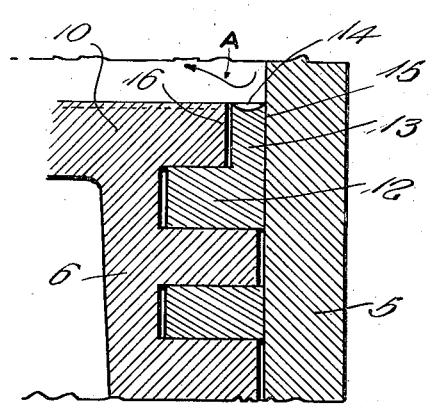
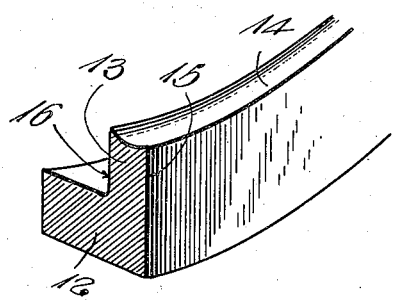
Inventor
Charles H. Lemery,
Witness Patented Dec. 6, 1927.

1,651,721

UNITED STATES PATENT OFFICE.

CHARLES H. LEMERY, OF SACRAMENTO, CALIFORNIA.

PISTON RING.

Application filed January 20, 1927. Serial No. 162,349.

The type of piston ring in common use at the present time upon internal combustion engines, is such that on each compression stroke of the piston, the condensed fuel film, and the film of oil and dust on the cylinder wall, are forced into and collected in the space which exists above the first or upper ring and between the cylinder wall and the piston, and as the piston advances to compress the gases, the liquid and dust are forced through the clearance of the piston ring and the upper side of the ring groove, into the clearance behind the ring, and this matter eventually finds its way into the crank case, often giving troubles with regard to lubrication. Moreover, this condition is the cause of excessive wear of the upper rings and grooves of pistons, the top ring of each piston being worn the most, the second ring showing only about half of the side clearance as the top ring, and the third or fourth rings showing practically no wear after a period of use equivalent to ten thousand miles operation of an automobile.

It is the object of my invention to overcome the difficulty above pointed out, by the provision of a new and improved ring of such form as to remove the condensed fuel film together with any accumulated oil and dust that have been deposited upon the cylinder wall during the suction and compression strokes, the ring serving to direct this material toward the center of the cylinder during the compression stroke, where it will be subjected to the burning gases during firing. The intense heat thus frees the dust particles of any oil or unburned fuel and leaves them in suspension in the gases, to pass out through the exhaust.

With the foregoing in view, the invention resides in the novel subject matter hereinafter described and claimed, the description being supplemented by the accompanying drawing.

Fig. 1 is a sectional view through a portion of the cylinder wall, an aluminum piston therein, and the invention applied to said piston.

Fig. 2 is an enlarged detail sectional view.

Fig. 3 is a sectional perspective view of a portion of one of the rings.

In the drawing above briefly described, the numeral 5 designates a cylinder wall and 6 denotes a piston therein. This piston is of the type commonly used when aluminum is employed in the piston construction, but it will be understood that my invention is not restricted to this particular type of piston.

The piston 6 is provided with the usual first, second and third ring grooves 7, 8 and 9 respectively, and between the first groove 7 and the piston head 10, said piston is reduced in diameter as indicated at 11. The improved piston ring is intended primarily for use in the first groove 7 but may be employed elsewhere also if desired.

The ring consists of a body portion 12 for reception in the groove 7, and a flange portion 13 integral with said body portion to surround the reduced part 11 of the piston 6, said flange portion being of a width to extend entirely to the piston head 10. The outer or peripheral surfaces of the body and flange portions 12 and 13 may be flush or they may be otherwise shaped for contact with the cylinder wall 5, and the upper or free edge of said flange portion 13 is formed with a continuous groove 14. The bottom of this groove meets the outer and inner surfaces 15—16, of the flange portion 13 at acute angles thereto, as will be clear from Figs. 2 and 3. By this construction, any accumulated matter on the cylinder wall 5 will be removed from said wall and immediately directed toward the center of the cylinder, as indicated by the arrow A in Fig. 2. This action of course takes place on each compression stroke and upon each exhaust stroke, and the matter thrown toward the center of the cylinder upon the compression stroke is subjected to the intense heat created by firing of the gases. This heat frees all dust and the like, leaving it in suspension for discharge from the cylinder with the exhaust gases.

If desired, one of the improved rings may be used in the groove 9, as illustrated in Fig. 1 and will then serve as an effective oil scraper. Openings 17 may be drilled to the interior of the piston from this groove if desired, to carry excess oil back to the crank case. In the groove 8, an ordinary ring may be employed. It may further be explained that if the piston skirt does not move out of the cylinder upon its movement toward the crank shaft, one of the improved rings may be employed at the inner end of this skirt, if desired.

As excellent results are obtainable from the details disclosed, they are preferably followed. However, within the scope of the invention as claimed, slight variations may be made.

I claim:

A piston ring having an annular body portion for reception in the ring groove of a piston nearest the head of the latter, and an annular flange portion projecting from said body portion to surround the part of the piston between the groove and the piston head, the peripheral surfaces of said portions being adapted for contact with the cylinder wall and the free edge of said flange portion being formed with a continuous groove whose bottom meets the inner and outer surfaces of said flange portion at acute angles thereto, said flange portion and its groove serving to remove oil, unburned fuel and dust from the cylinder wall and serving to throw them toward the center of the cylinder.

In testimony whereof I have hereunto affixed my signature.

CHARLES H. LEMERY.